United States Patent [19]

Cohen

[11] 4,256,176
[45] Mar. 17, 1981

[54] HEAT-RECLAIMING SYSTEM

[75] Inventor: Kenneth W. Cohen, Plainfield, N.J.

[73] Assignee: Aerco International, Inc., Northvale, N.J.

[21] Appl. No.: 894,835

[22] Filed: Apr. 10, 1978

[51] Int. Cl.³ .............................................. F28F 7/00
[52] U.S. Cl. ........................................ 165/76; 68/20; 165/163
[58] Field of Search ............................... 165/158–161, 165/163, 76–83; 122/7 R, DIG. 11; 68/20

[56] References Cited

U.S. PATENT DOCUMENTS

| | | | |
|---|---|---|---|
| 1,501,646 | 7/1924 | Brown | 165/78 X |
| 2,256,882 | 9/1941 | Sebald | 165/78 X |
| 2,362,985 | 11/1944 | Brown, Jr. | 165/76 X |
| 3,690,374 | 9/1972 | Vollhardt | 165/163 |
| 3,771,238 | 11/1973 | Vaugn | 68/20 |
| 4,151,730 | 5/1979 | Wendel | 68/20 |

FOREIGN PATENT DOCUMENTS 2707373  8/1978  Fed. Rep. of Germany .......... 122/7 R

*Primary Examiner*—Samuel Scott
*Assistant Examiner*—Theophil W. Streule, Jr.
*Attorney, Agent, or Firm*—Brumbaugh, Graves, Donohue & Raymond

[57] ABSTRACT

A heat-reclaiming system is especially adapted for reclaiming heat from used laundry water. It comprises a heat exchanger providing for heat transfer from warm used laundry water to cold incoming water intended for use as fresh laundry water. The heat exchanger is formed with interior ducts and an outer shell. The interior ducts, preferably concentric coils hydraulically in parallel, define a space for the transport through the heat exchanger of the cold incoming water. The outer shell encloses the ducts, and the ducts and shell together define a space providing for the transport through the heat exchanger of the warm used laundry water. The flows of the warm and cold water through the heat exchanger are generally in opposite directions. Maximum heat-transfer efficiency is accomplished by simultaneously pumping both the shell and the duct sides of the exchanger at design flow condition and maximizing the log mean temperature difference across the heat exchanger.

The heat exchanger is mounted above a pit that stores the used laundry water before it is introduced into the heat exchanger. The shell is of roll-away design and carries a pit cover plate that normally covers the pit but exposes the pit when the shell is removed. This minimizes heat loss from the pit during operation, while allowing for wash-down directly into the pit when the shell is removed during scheduled cleaning periods. The movable shell portion can be rolled away without breaking any pipe connections.

11 Claims, 5 Drawing Figures

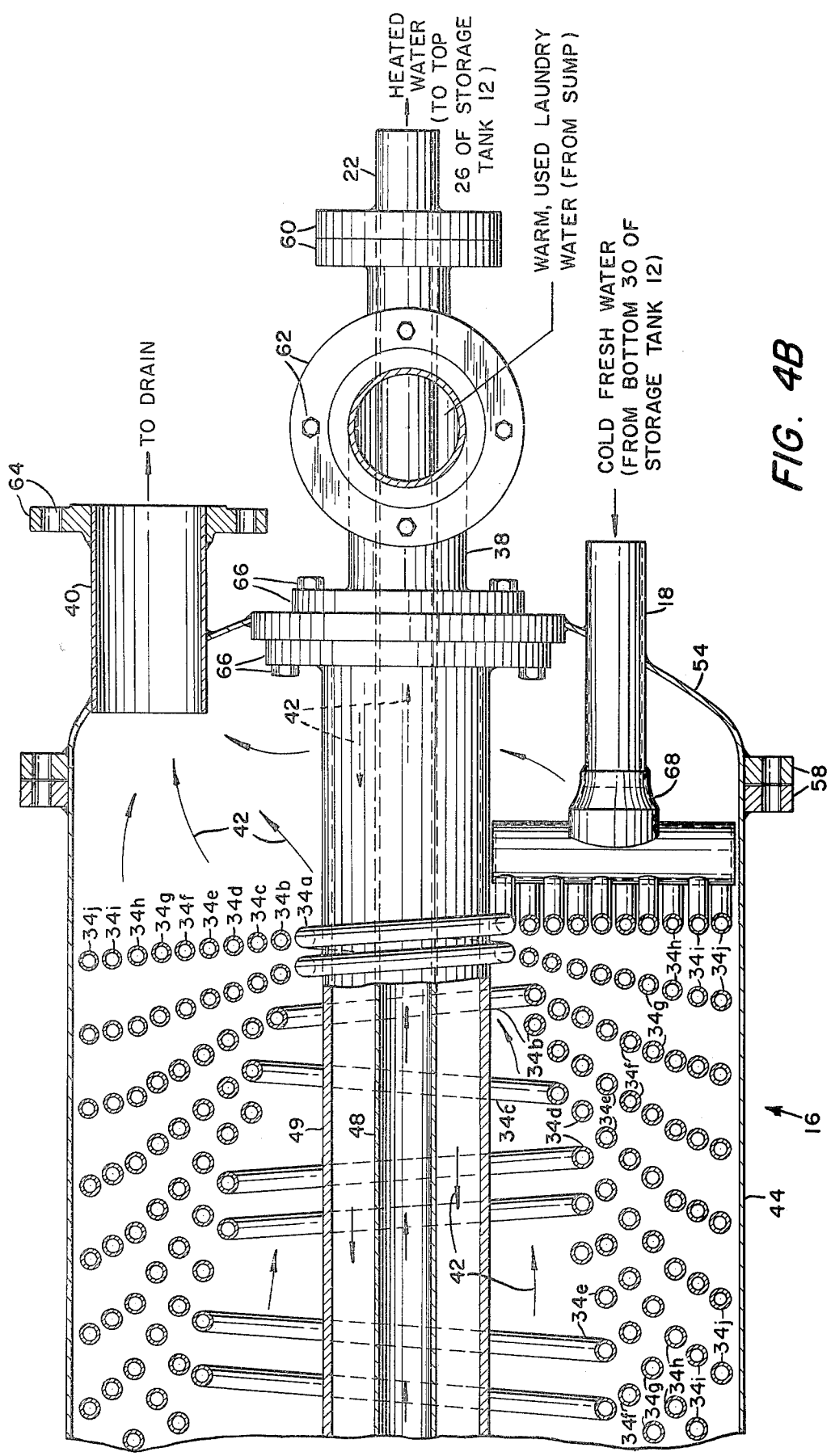

HEAT-RECLAIMING SYSTEM

BACKGROUND OF THE INVENTION

This invention relates to heat reclaiming and, more particularly, to a novel and highly-effective system that is particularly adapted for use in reclaiming heat from used laundry water.

Energy conservation is of extreme and growing importance because of a nationwide and indeed a worldwide present and projected shortage of energy. This invention contributes towards energy conservation by reclaiming a substantial portion of the heat in laundry water which is now customarily wasted when the used laundry water is discharged.

In both home and commercial laundries hot water is typically used for the washing of clothing. The thermal energy required to heat water to a temperature of, say, 180° F. from an initial temperature of, say, 50° F. is considerable, since the specific heat of water (1.0) is relatively high. A great deal of fuel, usually oil or gas, is consumed for this purpose. During the washing cycle, some heat is inevitably lost to the surroundings, but at the end of the washing cycle the temperature of the used laundry water may still be, say, 125° F. or more. When this relatively warm water is drained into a septic tank or sewer a great deal of potentially recoverable heat is irretrievably lost.

SUMMARY OF THE INVENTION

An object of the invention is to remedy the problem outlined above and in particular to provide for the recovery of large amounts of heat from used laundry water.

Another object of the invention is to provide a heat exchanger of high efficiency that is constructed in such a manner as to facilitate cleaning thereof.

The foregoing and other objects are attained in accordance with the invention by providing a heat-reclaiming system comprising a heat exchanger facilitating heat transfer from relatively warm used laundry water to relatively cool incoming water intended for use as fresh laundry water. The heat exchanger comprises interior ducts or tubes and an outer shell. The interior ducts define a space for the transport through the heat exchanger of either the warm used laundry water or the cool incoming water. In the preferred embodiment of the invention, the cool incoming water flows through the interior ducts. The outer shell encloses the ducts during operation of the system, and the ducts and the shell together define a space during operation of the system providing for the transport through the heat exchanger of the other of the two fluids: i.e., in the preferred embodiment of the invention, in which used laundry water is one of the two fluids involved in the heat-exchange process, the warm used laundry water flows through the shell around the ducts mentioned above. Additional ductwork or baffles, etc., may be provided to ensure that the flows of the warm and cool water through the heat exchanger are generally in opposite directions in order to improve the efficiency of the heat-exchange process, as explained in greater detail below. The two defined spaces for the warm and cool water are of course hydraulically isolated from each other to prevent commingling of the used laundry water and the fresh incoming water in the heat exchanger.

The system also comprises a sump or pit immediately below the heat exchanger for collecting the laundry water after use and before introduction into the heat exchanger and a plate covering the pit to reduce heat loss from the pit during operation of the system and uncovering the pit to allow wash-down of the heat exchanger directly into the pit during scheduled cleaning periods.

The construction is such as to permit opening of the heat exchanger and simultaneous uncovering of the pit. Specifically, the shell is formed in two mating sections, one stationary and the other movable. Preferably access to the pit and the interior of the heat exchanger is provided by means movably mounting both the plate and the movable portion of the shell, whereby the shell and the plate are easily movable as a unit, for example on wheels or roller bearings, between the closed and open positions.

In the open position, the movable portion of the shell is located immediately to one side of the ducts. The movable portion of the shell in the open position has generally the shape of a cylinder closed at one end and open at the other, and the open end is disposed adjacent to the ducts, whereby the draining of the wash-down water (which is sprayed onto the ducts and shell) into the pit is facilitated.

The ducts preferably define a plurality of concentric coils hydraulically in parallel. A first inlet admits the cool fresh water to the heat-exchanger coils, another inlet admits the warm used laundry water to the heat exchanger in the space around the coils, one outlet withdraws the relatively cool water from the coils after heating, and another outlet withdraws the relatively warm water from the space around the coils after cooling. Both of the inlets and both of the outlets penetrate only one of the two shell sections (viz, the stationary section) and are mounted in cantilever fashion. The shell can therefore be opened for cleaning of the interior of the heat exchanger by removing the other of the sections (viz, the movable section) and without disturbing any of the inlet and outlet connections.

The cool fresh water upon admittance to the heat exchanger is first brought into heat-exchange relation to the relatively warm used laundry water just prior to the exit of the latter from the heat exchanger, and the relatively warm used laundry water upon admittance to the heat exchanger is first brought into heat-exchange relation to the fresh water just as the latter flows out of the heat exchanger. Throughout the heat exchanger, in fact, the flows of the relatively cool and relatively warm fluids are generally counter to each other.

The coils are designed for substantially equal pressure drops along the length of each coil, and independent pumps are provided for the two fluids, so that the heat exchanger can be operated always at design flow conditions. By these means the log mean temperature difference across the heat exchanger is maximized. This maximizes the efficiency of the heat-exchange process.

The concentric coils formed by the heat-exchanger ducts are staggered so that the exterior of each coil is partially exposed when the shell is opened to permit cleaning. Since the coils are hydraulically in parallel, isolation (plugging) of failed coils is possible, thereby enabling continued operation of the heat exchanger even in case of total failure (rupture) of one or several coils.

BRIEF DESCRIPTION OF THE DISCLOSURE

A better understanding of the invention can be gained from a consideration of the following detailed description of the preferred embodiments thereof, in conjunction with the appended figures of the drawings, wherein.

Figure 2:
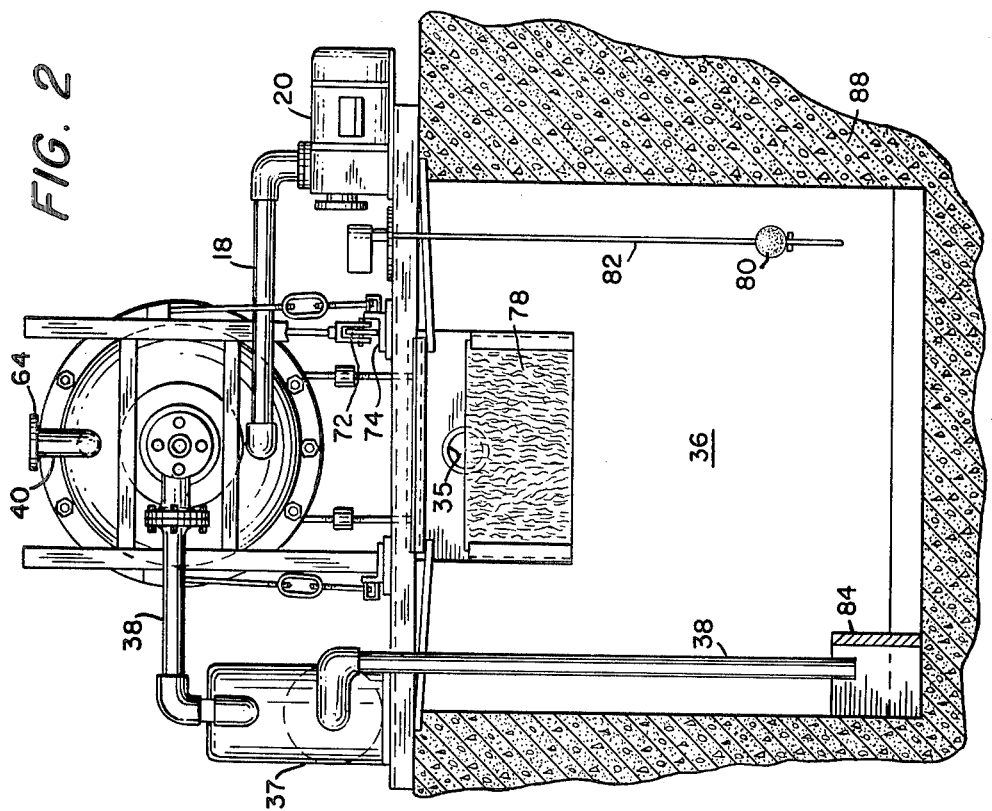
FIG. 2 is a view in end elevation of a portion of the apparatus shown schematically in FIG. 1.
Figure 1:
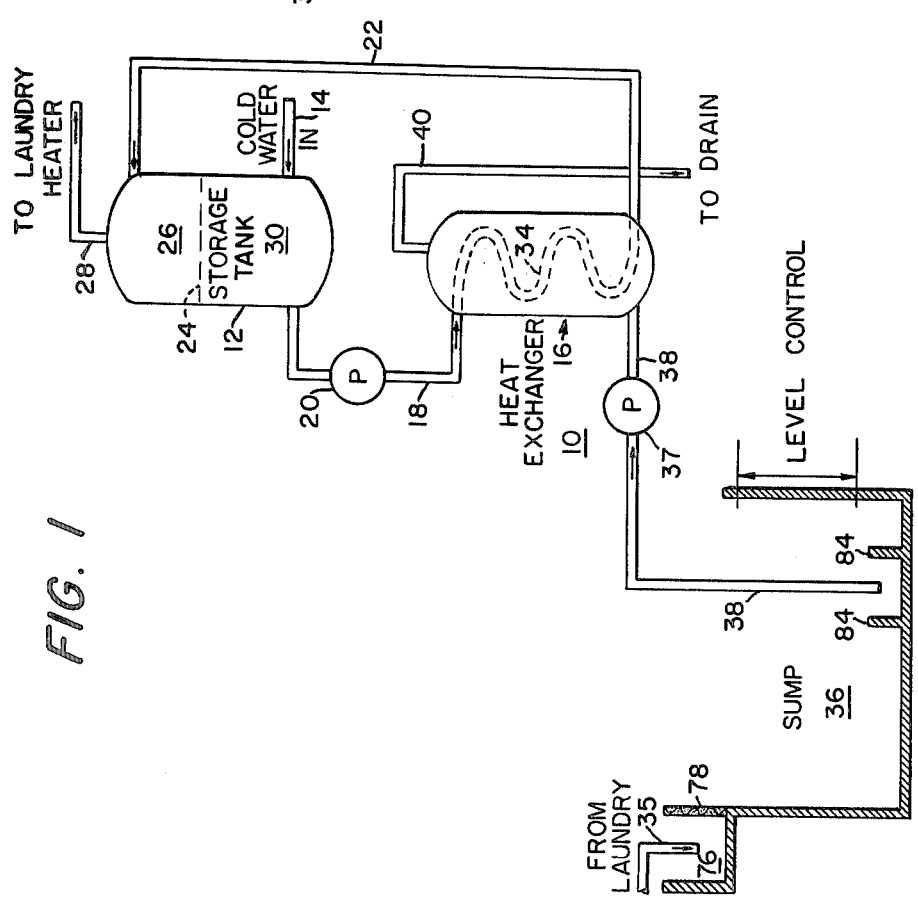
FIG. 1 is a schematic view of a preferred embodiment of apparatus constructed in accordance with the invention.
Figure 3:
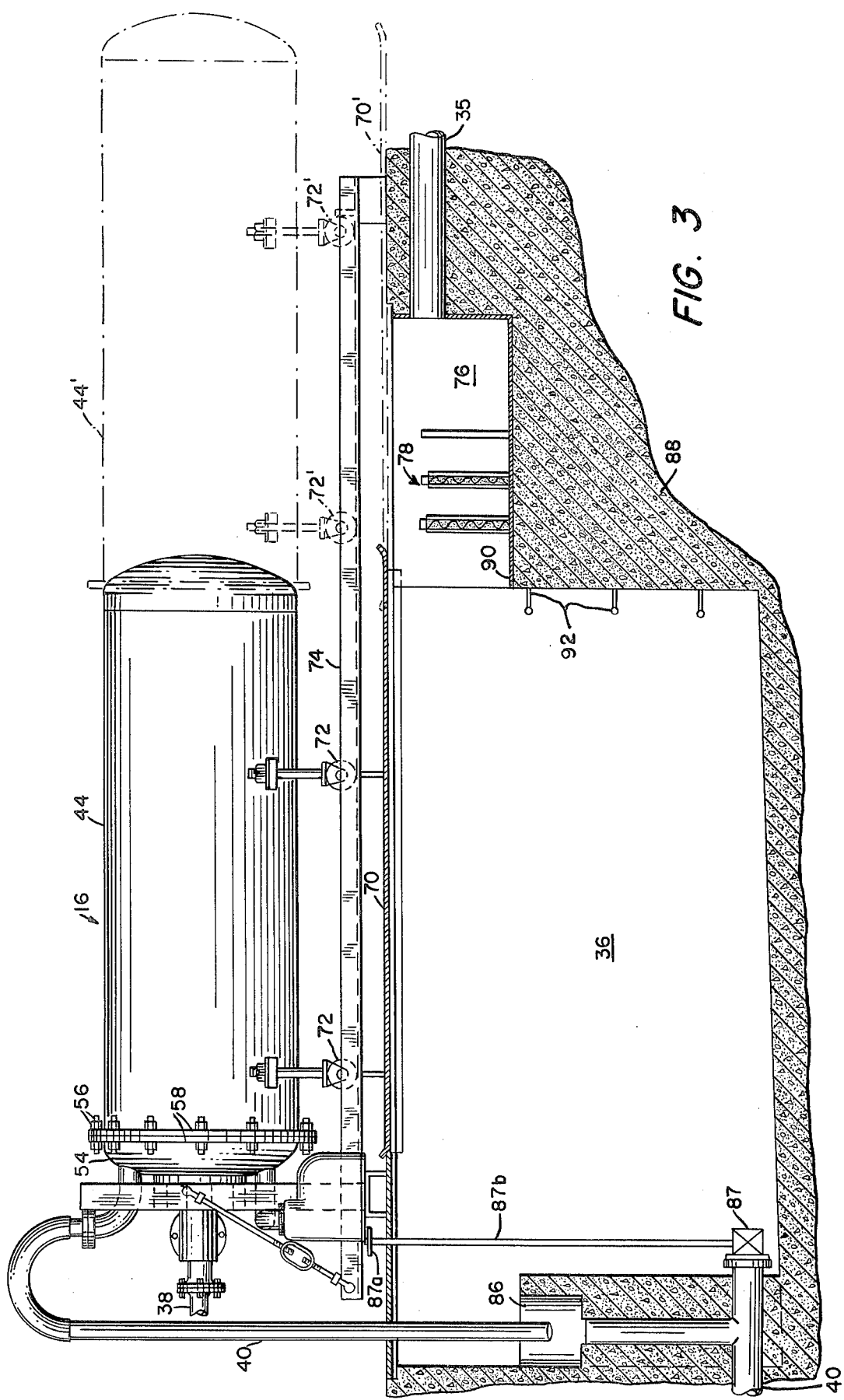
FIG. 3 is a view in side elevation of the apparatus of FIG. 2.
Figure 4A:
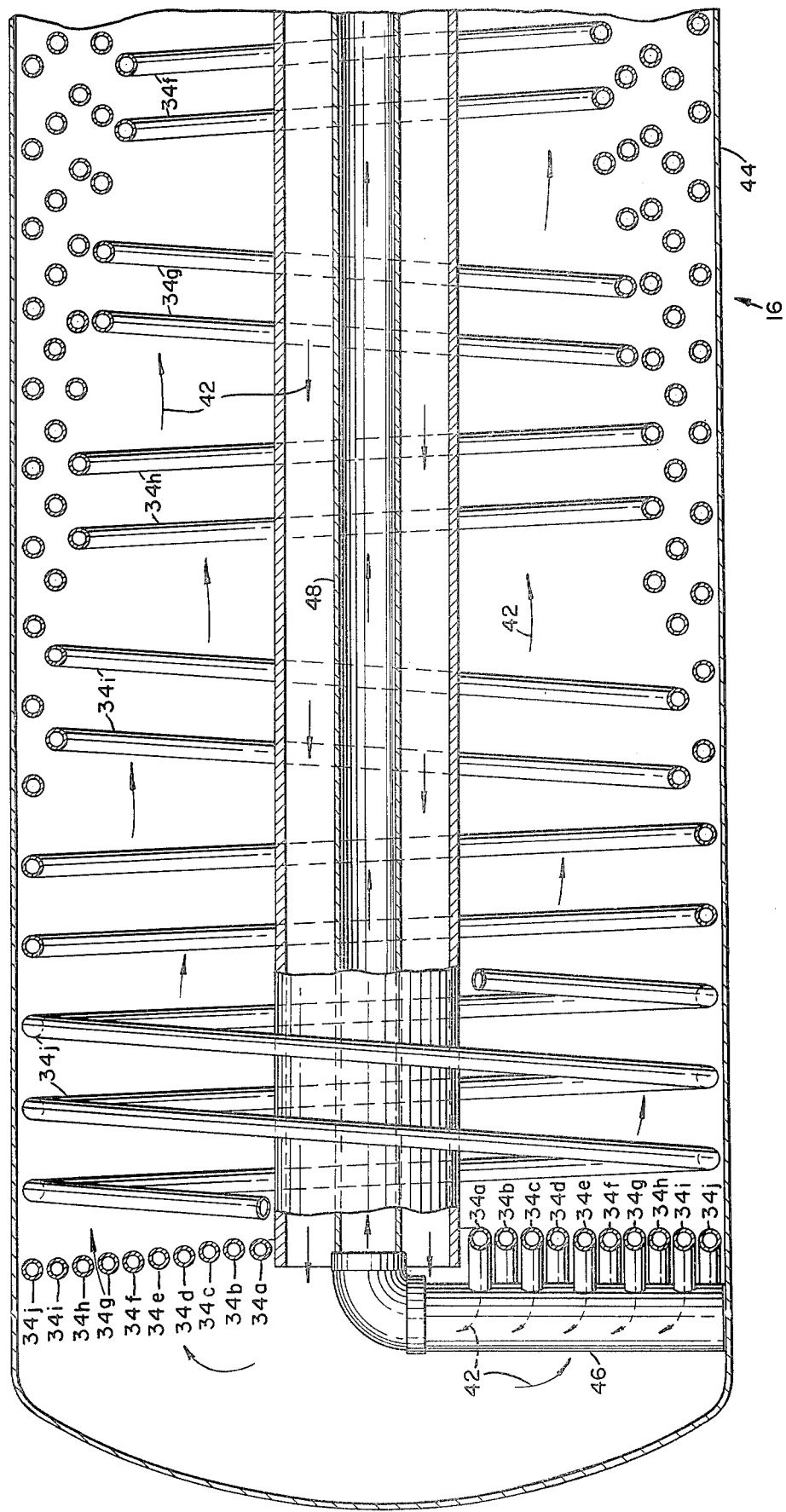

FIGS. 4A and 4B, when arranged with FIG. 4A to the left of FIG. 4B, are a sectional view showing the interior of a portion (viz, the heat exchanger) of the apparatus shown in FIGS. 1-3.

DESCRIPTION OF THE PREFERRED EMBODIMENTS

FIG. 1 shows apparatus 10 constructed in accordance with the invention and intended to be used in combination with a laundry comprising one or more conventional clothes-washing machines (not shown) in a home, apartment, hospital, or military or commercial installation. Cold water is introduced into a storage tank 12 through an inlet line 14. A heat exchanger or reclaimer 16 constructed in accordance with the invention preheats cold water drawn from the storage tank 12 through a line 18 by a pump 20. The preheated water is supplied through a line 22 back to the storage tank 12. The preheated water is less dense than the cold water and hence floats on the cold water in the storage tank 12.

The line of demarcation 24 between the preheated and the cool water moves up and down in the tank 12 during different parts of the cycle of operation of the washing machine or machines. Specifically, the washing machine or machines periodically draw preheated water from the top portion 26 of the storage tank 12 through a line 28 and a laundry heater (not shown), the latter being provided in order further to raise the temperature of the preheated water to the temperature required for the washing machines. As preheated water is thus withdrawn from the top portion 26 of the storage tank 12, cold water enters the bottom portion 30 of the storage tank 12 through the line 14, and the line of demarcation 24 rises. On the other hand, during periods when the washing machine or machines do not draw preheated water from the tank 12 and the pump 20 is in operation, cold water is withdrawn from the bottom portion 30 of the storage tank 12, circulated through the heat exchanger 16, and returned via the line 22 to the top portion 26 of the tank 12 as preheated water, so that the line of demarcation 24 falls.

In the heat exchanger 16, the cold water introduced by the line 18 is circulated through interior duct means indicated schematically in FIG. 1 by the dotted lines 34. As FIGS. 4A and 4B show, the interior duct means 34 preferably comprises a plurality of concentric coils 34a through 34j hydraulically in parallel. The heat exchanger or reclaimer 16 is so constructed that the cold incoming water flowing in the coils 34a through 34j flows in a direction generally counter to the direction of flow of the warm used laundry water. The latter comes from the laundry through a line 35 (FIGS. 1-3) into a sump or pit 36, is propelled by a pump 37 through a line 38 into the heat exchanger 16, and exits from the heat exchanger 16 through a drain line 40. The flow directions are readily apparent in the schematic (FIG. 1) and are indicated by arrows 42 in FIGS. 4A and 4B.

The coils 34a through 34j may all coil in the same direction but are preferably, as shown, alternately right handed and left handed (i.e., of Z and S configuration). Thus the coils 34a, 34c, 34e, 34g and 34i may be right handed and the coils 34b, 34d, 34f, 34h and 34j left handed, or vice versa. The pitch of each coil, the spacing between coils (i.e., the coil diameters), the inside diameters of the pipes of which the coils are made, and the lengths of the respective coils are such that the pressure drop across each coil is the same. The inner coils make relatively tight bends compared to the outer coils, so that, other factors such as pipe diameter being the same, the inner coils have a greater pressure drop per unit of length than the outer coils. This is compensated for by, for example, making the flow paths through the outer coils longer than those through inner coils. At the same, the pitch of the several coils is related to the respective coil diameters in such a manner that the coils are staggered: i.e., the exterior of each coil is partially exposed for cleaning by a high-pressure hose when the movable outer shell portion 44 (FIGS. 3 and 4A and 4B) of the heat exchanger 16 is removed to the broken-line position 44' shown in FIG. 3.

In accordance with the invention, the log mean temperature difference across the heat exchanger 16 is maximized, thereby maximizing the efficiency of the heat-exchange process. This is accomplished by the special structure of the apparatus of the invention, including the counterflow feature and the independent pumps 20 and 37. Thus where the water to be preheated is at its coldest, namely at the right ends of the coils 34a through 34j (FIG. 4B), it absorbs heat from the used laundry water just prior to the discharge of the latter to the drain line 40. This is the point where the used laundry water is at its coolest in the heat exchanger 16. Similarly, where the water to be preheated is at its warmest in the heat exchanger, namely as it flows from the manifold 46 (FIG. 4A) and along the straight pipe 48 (FIGS. 4A and 4B) to the pipe 22 (FIG. 4B), it is in heat-exchange relation with the water from the laundry pit or sump 36 when the latter is at its hottest in the heat exchanger 16, namely as it flows through the space defined by the straight pipe 48 and a baffle 49 concentric therewith. Thus at all points in the heat exchanger 16 there is a temperature gradient favoring heat transfer from the relatively warm used laundry water to the relatively cool incoming water; at no point does the temperature gradient vanish or assume a polarity or direction opposite the one intended. Moreover, there is a minimal variation in the temperature difference between the two fluids at all points along the heat exchanger 16. Since the pumps 20 and 37 are operated independently, both flows through the heat exchanger 16 are controllable independently. By maintaining design flow conditions for both the shell side and the duct side of the heat exchanger 16, the logarithm of the average temperature difference between the warm, used laundry water and the cold incoming water at each point in the heat exchanger 16 is maximized, thus maximizing the efficiency of the system.

In a typical laundry installation, the average water temperature in the washing machines may be, for example, 180° F., while the temperature of the cold incoming water may be, for example, 50° F. If then the temperature of the used laundry water entering the heat exchanger 16 is 125° F., the temperature of the water leaving the heat exchanger 16 via the drain 40 is 84.7° F., and the temperature of the water leaving the duct 48 via the line 22 is 105° F., then a 42% fuel savings may be realized. These conditions are easily met in accordance with the present invention with a heat-exchange area of 150 ft².

The calculation is as follows: The fuel savings, expressed as a percentage, equals the quantity of heat reclaimed (e.g., in BTU's per hour) divided by the quantity of heat required (in BTU's per hour). That is, $$\frac{Qt \times \Delta Tt \times 500}{2 \text{ gallons/lb} \times \text{lb} \times 1/60 \times \Delta T_L \times 500} = \frac{\Delta Tt}{\Delta T_L},$$

where $\Delta Tt = \Delta T$ in °F. of the cold incoming water in its passage through the heat exchanger 16 and $\Delta T_L = \Delta T$ between the water entering the washing machines and the cold incoming water at the inlet to the heat exchanger 16. The fuel savings is thus $(105-50)/(180-50) = 42\%$.

In addition to the movable shell section 44, the shell is formed with a mating stationary section 54 (FIGS. 3 and 4B). Both of the inlets 18 and 38 and both of the outlets 22 and 40 penetrate only the stationary section 54. The duct means constituted by the coils 34a through 34j are mounted within the shell 44, 54 in cantilever fashion and provide no structural support for any other part of the system. The sections 44 and 54 are removably secured together by fastening means such as nuts and bolts 56 (FIG. 3) along flanges 58 (FIGS. 3 and 4B). The nuts and bolts 56 can be removed so that the shell sections 44 and 54 can be separated for cleaning of the coils 34a through 34j and the interior of the shell without disturbing any of the pipe connections. However, additional connections 60, 62, 64, 66 and 68 provide for ease of assembly and for the rare case where total disassembly is required (for example, in case of replacement of the entire system).

The apparatus of the invention is characterized by a number of additional features that contribute to its efficient operation. Thus the movement of the shell section 44 to its position 44' and of the plate 70 to its position 70' (FIG. 3) is facilitated by movably mounting the shell section 44 and plate 70 on access means comprising roller bearings or trolley wheels 72. The roller bearings or wheels 72 roll on guides 74 which are mounted in a stationary manner with respect to the apparatus 10.

Moreover, the pit or sump 36 is formed with a portion 76 equipped with sheet catcher and filter means 78 for filtering the used laundry water to remove lint, etc., prior to the introduction of the water to the sump 36 proper.

A level control, indicated schematically in FIG. 1, comprises a float 80 (FIG. 2) connected to an actuating arm 82 which actuates limit switches (not shown) controlling the pump 37. In this way, the level of liquid in the sump 50 is maintained between upper and lower limits as indicated schematically in FIG. 1.

The lower end of the suction line 38 extends below a dam 84, as indicated in FIGS. 1 and 2, and the drain 40 is constructed to accept overflow from the sump 36, as indicated at 86 (FIG. 3), in case the level control fails to maintain the level within the sump 50 at or below the intended upper limit. Moreover, the drain 40 communicates with the sump 36 through a valve 87 (FIG. 3) controlled by a wheel 87a and rod 87b. This facilitates draining the sump 36 in connection with the wash-down procedure.

The sump 36 may be formed of concrete, as indicated at 88 in FIGS. 2 and 3, and the portion 76 may include a metal liner 90. The bottom of the sump 36 preferably slopes toward the valve 87 and drain 40, as indicated in FIG. 3, and a ladder 92 may be provided to permit access to the sump for scrubbing and servicing.

Thus there is provided in accordance with the invention a compact counterflow heat exchanger that affords a large heat-exchange surface in a small space. The heat exchanger incorporates a cantilevered design that isolates the shell section 44 from a role in mechanical support. The roll-away shell portion 44 enhances exchanger serviceability in that it is unnecessary to break pipe connections for servicing. Any specific coil 34a through 34j can be isolated (plugged) so that a failure of one or several coils will not disable the system. Any suitable material—e.g., copper, stainless steel, plastics, etc.—can be used for the construction of the heat exchanger. The filters and sheet catcher prevent lint buildup in the pit, minimizing down time.

Many modifications of the representative embodiment of the invention disclosed above will readily occur to those skilled in the art upon consideration of the present disclosure. For example, while the invention in the preferred embodiment disclosed is employed to reclaim heat from used laundry water, it can be employed also to reclaim heat from many other fluids in a wide variety of environments. Accordingly, the invention is to be construed as covering all embodiments thereof within the scope of the appended claims.

I claim:

1. In a heat exchanger comprising duct means in the form of a plurality of coils and shell means, said duct means providing a first space for the transport through said heat exchanger of a first fluid at one temperature, said shell means enclosing said duct means during operation of said heat exchanger, and said duct means and said shell means together providing a second space during operation of said heat exchanger for the transport through said heat exchanger of a second fluid at a different temperature, said two spaces being isolated from each other to prevent commingling of said fluids in said heat exchanger, further comprising inlet means for admitting a relatively cool fluid to said heat exchanger, inlet means for admitting a relatively warm fluid to said heat exchanger, outlet means for withdrawing said relatively cool fluid after heating, and outlet means for withdrawing said relatively warm fluid after cooling, a connection means being provided for connecting one of said inlet means and its corresponding outlet means to said first space and the other of said inlet and outlet means to said second space, the improvement characterized in that:

said shell means is in the form of a stationary section and a movable section, both of said inlet means and both of said outlet means penetrating only said, stationary section, said duct means being mounted within said shell means on said stationary section in cantilever fashion;

said shell means is openable for exposure of said coils and cleaning of the interior of said heat exchanger solely by moving said movable section away from said stationary section without disturbing any of said inlet and outlet means or said connection means; and said coils are concentric and staggered so that each coil is partly exposed along its longitudinal extent to permit cleaning thereof solely by removal of said movable shell section from said stationary shell section.

2. A heat exchanger according to claim 1 wherein said relatively cool fluid upon admittance into said heat exchanger is first brought into heat-exchange relation to said relatively warm fluid just prior to exit of said relatively warm fluid from said heat exchanger and said relatively warm fluid upon admittance to said heat exchanger is first brought into heat-exchange relation to said relatively cool fluid just prior to exit of said relatively cool fluid from said heat exchanger, and wherein the flows of said relatively cool and warm fluids are independently controllable and generally counter to each other, whereby the log mean temperature difference across said heat exchanger is maximized, thereby maximizing the efficiency of the heat-exchange process.

3. A heat exchanger according to claim 1 wherein said plurality of coils, are in parallel to permit isolation of failed coils, thereby enabling continued operation of the heat exchanger notwithstanding failure of one or more of said coils.

4. A heat exchanger according to claim 1 further comprising independent pumping means for said two fluids, whereby the heat exchanger can be operated at design flow condition.

5. A heat exchanger according to claim 1 wherein substantially equal pressure drops are developed along the length of each coil.

6. A laundry-head-reclaiming system providing for simplicity of cleaning, comprising:

heat-exchange means providing for heat transfer from relatively warm used laundry water to relatively cool incoming water intended for use as fresh laundry water, said heat exchange means including duct means in the form of a plurality of staggered and concentric coils hydraulically in parallel, said coils being alternately right-handed and left-handed, and shell means, in the form of a movable section and a stationary section to which said coils are attached in cantilever fashion, said duct means defining a first space providing for the transport through said heat-exchange means of one of said warm laundry water and said cool incoming water, said shell means enclosing said duct means during operation of said system, and said duct means and said shell means together defining a second space during operation of said system providing for the transport through said heat-exchange means of the other of said warm laundry water and said cool incoming water, said two defined spaces being isolated from each other to prevent commingling of said warm laundry water and said cool incoming water in said heat-exchange means;

pit means for collecting said laundry water after use and before introduction to said heat-exchange means;

plate means covering said pit means to reduce heat loss from said pit means during operation of said system and uncovering said pit means to permit wash-down of at least a portion of said heat-exchange means directly into said pit means during scheduled cleaning periods; and access means permitting opening of said heat-exchange means and uncovering of said pit means by removing said movable section of the shell from the stationary section to at least partially expose said coils along their longitudinal extent, said heat-exchange means and said pit means being so arranged with respect to each other in the open position that wash-down water applied to said heat-exchange means is drainable therefrom into said pit means.

7. A laundry-heat-reclaiming system according to claim 6 wherein said access means comprises means movably mounting said shell means and said plate means, whereby said shell means and said plate means are movable to a closed position during operation of said system wherein said shell means encloses said duct means and to an open position during scheduled cleaning periods wherein said plate means uncovers said pit means and said duct means is exposed for cleaning.

8. A laundry-heat-reclaiming system according to claim 6 wherein said shell means and said plate means are directly connected to each other and move as a unit.

9. A laundry-heat-reclaiming system according to claim 6 wherein said means movably mounting said shell means comprises roller bearings.

10. A laundry-heat-reclaiming system according to claim 6 wherein said heat-exchange means is mounted above said pit means, whereby the draining of wash-down water applied to said heat-exchange means into said pit means is facilitated.

11. A laundry-heat-reclaiming system according to claim 10 wherein said duct means is mounted directly above said pit means and wherein, in the open position, said shell means is mounted to the side of said duct means, said shell means in the open position having generally the shape of a cylinder closed at one end and open at the other, said open end being disposed adjacent said duct means, whereby the draining of wash-down water applied to said duct means and said shell means into said pit means is facilitated.

* * * * *

UNITED STATES PATENT AND TRADEMARK OFFICE
CERTIFICATE OF CORRECTION

PATENT NO. : 4,256,176

DATED : March 17, 1981

INVENTOR(S) : Kenneth W. Cohen

It is certified that error appears in the above—identified patent and that said Letters Patent is hereby corrected as shown below:

Col. 7, line 32, "head" should read --heat--.

Signed and Sealed this

Fourth Day of August 1981

[SEAL]

Attest:

GERALD J. MOSSINGHOFF

*Attesting Officer*    *Commissioner of Patents and Trademarks*